(12) United States Patent
Takada et al.

(10) Patent No.: US 12,287,029 B2
(45) Date of Patent: Apr. 29, 2025

(54) STARTING DEVICE

(71) Applicant: EXEDY Corporation, Neyagawa (JP)

(72) Inventors: Yukiyoshi Takada, Neyagawa (JP); Tomohiro Wada, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 269 days.

(21) Appl. No.: 18/074,654

(22) Filed: Dec. 5, 2022

(65) Prior Publication Data

US 2023/0213091 A1 Jul. 6, 2023

(30) Foreign Application Priority Data

Jan. 5, 2022 (JP) ................................. 2022-000345

(51) Int. Cl.
*F16H 45/02* (2006.01)
*F16H 41/24* (2006.01)

(52) U.S. Cl.
CPC ............. *F16H 45/02* (2013.01); *F16H 41/24* (2013.01)

(58) Field of Classification Search
CPC .............. F16H 45/02; F16H 2041/243; B60K 6/20–547; H02K 7/006; H02K 7/10
See application file for complete search history.

(56) References Cited

U.S. PATENT DOCUMENTS

| | | | | |
|---|---|---|---|---|
| 2005/0150734 A1* | 7/2005 | Breier | ................... | B60K 6/405 |
| | | | | 903/952 |
| 2019/0376589 A1* | 12/2019 | Samie | ...................... | B60K 6/40 |
| 2020/0040976 A1* | 2/2020 | Steiner | ................... | B60K 6/405 |
| 2022/0219524 A1* | 7/2022 | Binder | ................... | B60K 6/387 |

FOREIGN PATENT DOCUMENTS

JP        2021-154922 A    10/2021

* cited by examiner

*Primary Examiner* — Ernesto A Suarez
*Assistant Examiner* — Lillian T Nguyen
(74) *Attorney, Agent, or Firm* — United IP Counselors, LLC

(57) ABSTRACT

A starting device includes a fluid coupling, an electric motor, and a restriction mechanism. The electric motor includes a rotor and a stator. The rotor is disposed radially outside the fluid coupling. The restriction mechanism restricts relative rotation between the fluid coupling and the rotor. The restriction mechanism includes a first key groove, a second key groove, and a key body. The first key groove is provided on an inner peripheral surface of the rotor to extend in an axial direction. The second key groove is provided on an outer peripheral surface of the fluid coupling to extend in the axial direction. The second key groove is lesser in length than the first key groove. The key body includes a first key portion and a second key portion. The first key portion is fitted to the first key groove. The second key portion is fitted to the second key groove.

8 Claims, 4 Drawing Sheets

STARTING DEVICE

CROSS-REFERENCE TO RELATED APPLICATIONS

This application claims priority to Japanese Patent Application No. 2022-000345 filed Jan. 5, 2022. The entire contents of that application are incorporated by reference herein in their entirety.

TECHNICAL FIELD

The present invention relates to a starting device.

BACKGROUND ART

There has been proposed a type of starting device including a torque converter and an electric motor. For example, Japan Laid-open Patent Application Publication No. 2021-154922 discloses a starting device that a rotor of an electric motor is connected to an impeller of a torque converter so as to be integrated therewith.

A method of attaching the rotor of the electric motor to the outer peripheral surface of the torque converter is unknown in the starting device configured as described above. In view of this, it is an object of the present invention to provide a starting device that a rotor can be appropriately attached to the outer peripheral surface of a fluid coupling.

BRIEF SUMMARY

A starting device according to an aspect of the present invention includes a fluid coupling, an electric motor, and a restriction mechanism. The electric motor includes a rotor and a stator. The rotor is disposed radially outside the fluid coupling. The stator is disposed radially outside the rotor. The restriction mechanism is configured to restrict relative rotation between the fluid coupling and the rotor. The restriction mechanism includes a first key groove, a second key groove, and a key body. The first key groove is provided on an inner peripheral surface of the rotor so as to extend in an axial direction. The second key groove is provided on an outer peripheral surface of the fluid coupling so as to extend in the axial direction. The second key groove is lesser in length than the first key groove. The key body includes a first key portion and a second key portion. The first key portion is fitted to the first key groove, whereas the second key portion is fitted to the second key groove.

According to this configuration, the key body is fitted to the first key groove provided on the inner peripheral surface of the rotor, while being fitted to the second key groove provided on the outer peripheral surface of the fluid coupling. Because of this, the fluid coupling and the rotor are made unitarily rotatable. In other words, according to the configuration described above, the rotor can be appropriately attached to the outer peripheral surface of the fluid coupling.

Preferably, the fluid coupling includes a cover and an impeller. The cover and the impeller form the outer peripheral surface of the fluid coupling. The second key groove is provided on only one of the cover and the impeller.

Preferably, the second key groove is provided on the one of the cover and the impeller greater in outer diameter than the other thereof.

Preferably, the cover includes a first cylindrical portion extending in the axial direction. The impeller includes a second cylindrical portion that extends in the axial direction and is fixed to the first cylindrical portion. The first and second cylindrical portions form the outer peripheral surface of the fluid coupling. The second key groove is provided on one of the first and second cylindrical portions greater in plate thickness than the other thereof.

Preferably, the first key groove extends from one end to the other end of the rotor in the axial direction.

Preferably, the first and second key portions are provided as different members separated from each other and are engaged to be non-rotatable relative to each other.

Preferably, the first key groove is greater in width than the second key groove. The first key portion includes a slit extending from a base end thereof in the axial direction. The second key portion is fitted to the slit.

Preferably, the key body includes a distal end protruding from the first key groove in the axial direction. The distal end is configured to spread in an intersecting direction to the axial direction.

Overall, according to the present invention, the rotor can be appropriately attached to the outer peripheral surface of the fluid coupling.

DETAILED DESCRIPTION

Figure 1:
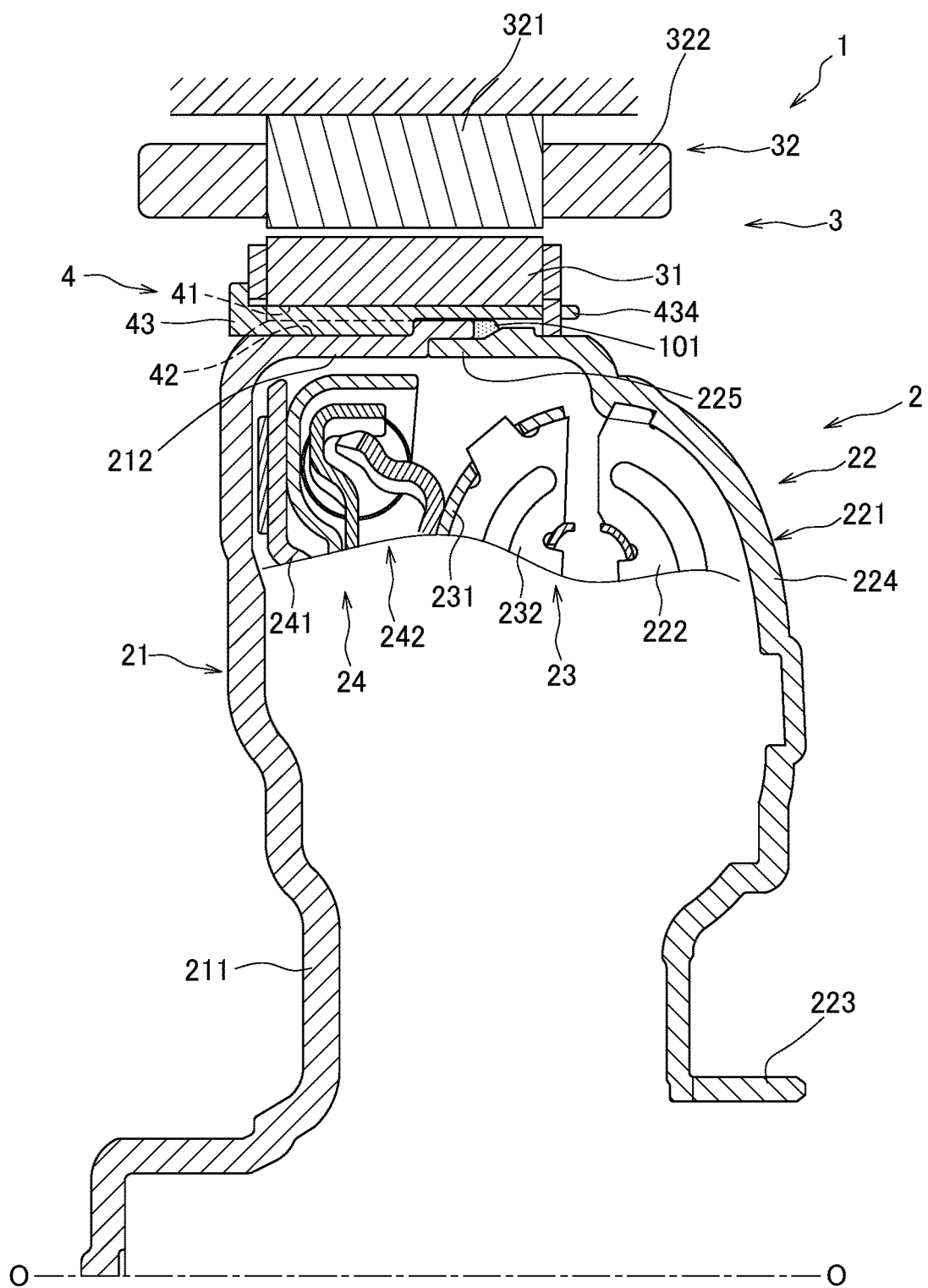
FIG. 1 is a cross-sectional view of a starting device.

A starting device according to the present preferred embodiment will be hereinafter explained with reference to drawings. It should be noted that in the following explanation, the term "axial direction" refers to an extending direction of a rotational axis O of the starting device. On the other hand, the term "circumferential direction" refers to a circumferential direction of an imaginary circle about the rotational axis O, whereas the term "radial direction" refers to a radial direction of the imaginary circle about the rotational axis O. FIG. 1 is a cross-sectional view of the starting device and herein omits illustration of some constituent members.

[Starting Device]

As shown in FIG. 1, a starting device 1 includes a torque converter 2 (exemplary fluid coupling), an electric motor 3, and a restriction mechanism 4. It should be noted that, although not shown in FIG. 1, an engine is disposed on the left side of the starting device 1, whereas a transmission is disposed on the right side of the starting device 1.

[Torque Converter]

The torque converter 2 includes a cover 21, an impeller 22, and a turbine 23. Besides, the torque converter 2 includes a torque converter stator (not shown in the drawings) and a lock-up device 24. The torque converter 2 contains oil circulating in the interior thereof. The torque converter 2 is disposed to be rotatable about the rotational axis O.

The cover 21 receives a torque inputted thereto from the engine. The cover 21 composes part of an outer shell of the torque converter 2. The cover 21 includes a first disc portion 211 and first cylindrical portion 212. The first cylindrical portion 212 axially extends from the outer peripheral end of the first disc portion 211 toward the impeller 22.

Figure 2:
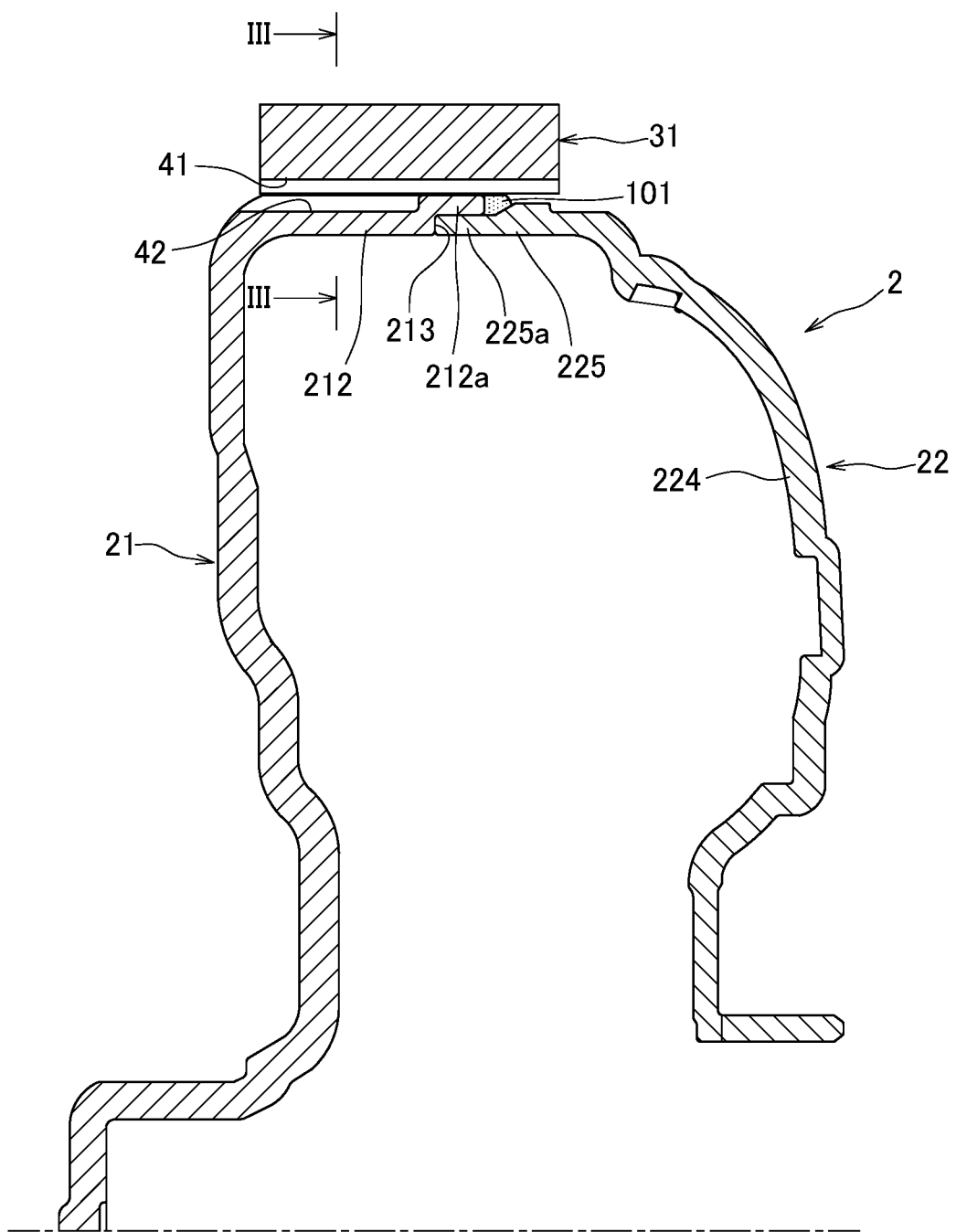
FIG. 2 is a side view of a rotor and an outer shell of a torque converter.

FIG. 2 is a diagram obtained by extracting only a rotor 31 and the outer shell of the torque converter 2 from FIG. 1. As shown in FIG. 2, the first cylindrical portion 212 is lesser in thickness at a distal end 212a thereof than at the other part thereof. When described in detail, the distal end 212a of the first cylindrical portion 212 is greater in inner diameter than the other part thereof. Because of this, an abutting surface 213 is formed on an imaginary boundary line between the distal end 212a and the other part. The abutting surface 213 faces the axial direction. The abutting surface 213 contacts with the distal end surface of a second cylindrical portion 225 of an impeller shell 221 (to be described).

As shown in FIG. 1, the impeller 22 is fixed to the cover 21. The impeller 22 includes an impeller shell 221, a plurality of impeller blades 222, and an impeller hub 223. The impeller shell 221 is fixed to the cover 221 by, for instance, a welding portion 101. It should be noted that the outer peripheral surface of the welding portion 101 is flush to that of the first cylindrical portion 212. For example, the outer peripheral surface of the welding portion 101 and that of the first cylindrical portion 212 can be flush to each other by cutting the welding portion 101.

The impeller shell 221 composes the outer shell of the torque converter 2 together with the cover 21. The impeller shell 221 includes a second disc portion 224 and the second cylindrical portion 225.

As shown in FIG. 2, the second cylindrical portion 225 axially extends from the outer peripheral end of the second disc portion 224 toward the cover 21. The second cylindrical portion 225 is fixed at a distal end 225a to the first cylindrical portion 212 by the welding portion 101. The distal end 225a of the second cylindrical portion 225 is disposed radially inside the distal end 212a of the first cylindrical portion 212. In a radial view, the distal end 212a of the first cylindrical portion 212 and the distal end 225a of the second cylindrical portion 225 overlap with each other. The distal end 225a of the second cylindrical portion 225 is in contact at the distal end surface thereof with the abutting surface 213.

The second cylindrical portion 225 forms the outer peripheral surface of the torque converter 2 together with the first cylindrical portion 212. The second cylindrical portion 225 is lesser in outer diameter than the first cylindrical portion 212. The second cylindrical portion 225 is approximately equal in inner diameter to the first cylindrical portion 212. The second cylindrical portion 225 is lesser in plate thickness than the first cylindrical portion 212.

As shown in FIG. 1, the impeller blades 222 are fixed to the inner surface of the impeller shell 221. The impeller hub 223 is fixed to the inner peripheral end of the impeller shell 221 by welding or so forth.

The turbine 23 is disposed in opposition to the impeller 22. The turbine 23 includes a turbine shell 231 and a plurality of turbine blades 232. The turbine blades 232 are fixed to the inner surface of the turbine shell 231 by brazing or so forth.

The torque converter stator is configured to regulate the flow of hydraulic oil returning from the turbine 23 to the impeller 22. The torque converter stator is rotatable about the rotational axis O. The torque converter stator is disposed axially between the impeller 22 and the turbine 23.

The lock-up device 24 is disposed axially between the cover 21 and the turbine 23. The lock-up device 24 includes a piston plate 241 and a damper device 242.

[Electric Motor]

The electric motor 3 includes the rotor 31 and a stator 32.

As shown in FIG. 2, the rotor 31 has a cylindrical shape. The rotor 31 is formed by axially laminating a plurality of electromagnetic steel plates. The rotor 31 is disposed to be rotatable about the rotational axis O. The rotor 31 is disposed radially outside the torque converter 2. The inner peripheral surface of the rotor 31 is opposed to the outer peripheral surface of the torque converter 2. Besides, the inner peripheral surface of the rotor 31 is in contact with the outer peripheral surface of the torque converter 2. When described in detail, the inner peripheral surface of the rotor 31 is in contact with the outer peripheral surface of the first cylindrical portion 212. On the other hand, the inner peripheral surface of the rotor 31 is disposed radially apart from the outer peripheral surface of the second cylindrical portion 225 at an interval.

The rotor 31 is greater in axial dimension than the first cylindrical portion 212. In the radial view, the rotor 31 overlaps with the first cylindrical portion 212 and the second cylindrical portion 225.

As shown in FIG. 1, the stator 32 includes a stator core 321 and a coil 322. The stator core 321 is formed by axially laminating a plurality of electromagnetic steel plates. The coil 322 is wound around teeth of the stator core 321.

The stator 32 is disposed radially outside the rotor 31. The stator 32 is disposed radially apart from the rotor 31 at an interval. The stator 32 is disposed to be non-rotatable. The stator 32 is fixed to a casing (not shown in the drawings) or so forth.

[Restriction Mechanism]

The restriction mechanism 4 is configured to restrict the torque converter 2 and the rotor 31 from rotating relative to each other. In other words, the restriction mechanism 4 is configured to make the torque converter 2 and the rotor 31 rotate unitarily with each other.

Figure 3:
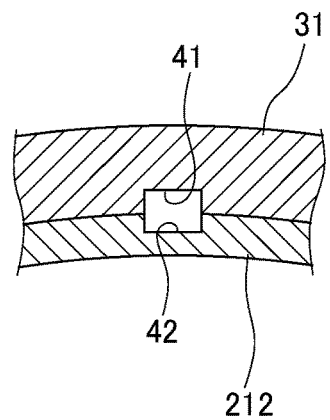
FIG. 3 is a cross-sectional view taken along line in FIG. 2.

FIG. 3 is a cross-sectional view of FIG. 2 taken along line III-III. As shown in FIGS. 1 to 3, the restriction mechanism 4 includes a first key groove 41, a second key groove 41, and a key body 43. The first key groove 41 is provided on the inner peripheral surface of the rotor 31. The first key groove 41 extends in the axial direction. The first key groove 41 extends from one end to the other end of the rotor 31 in the axial direction. In other words, the first key groove 41 is opened at both ends in the axial direction.

The second key groove 42 is provided on the outer peripheral surface of the torque converter 2. When described in detail, the second key groove 42 is provided on the outer peripheral surface of the first cylindrical portion 212. The second key groove 42 is equal in width to the first key groove 41. It should be noted that the width of each key groove 41, 42 means the circumferential dimension thereof.

The second key groove 42 extends in the axial direction. Besides, the second key groove 42 is provided only on the first cylindrical portion 212 without being provided on the second cylindrical portion 225. Moreover, the second key groove 42 is not provided on the distal end 212a of the first cylindrical portion 212. The distal end of the second key groove 42 is located closer to the first disc portion 211 than the abutting surface 213. The second key groove 42 is lesser in axial length than the first key groove 41.

Figure 4:
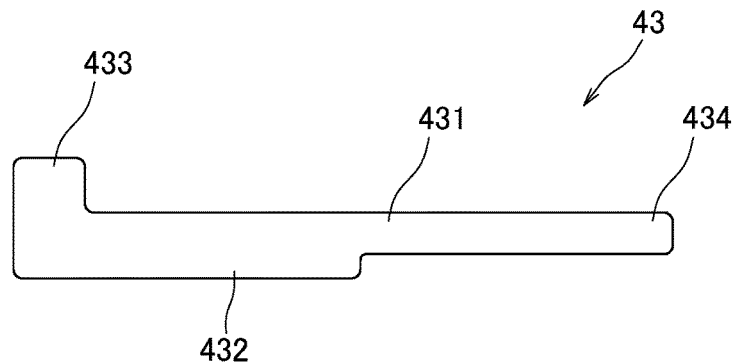
FIG. 4 is a side view of a key body.

As shown in FIG. 4, the key body 43 includes a first key portion 431 and a second key portion 432. The first and second key portions 431 and 432 are provided as a single member. The key body 43 can be made of, for instance, high-carbon steel, stainless steel, or so forth. Besides, the key body 43 can be formed by, for instance, forging or cutting.

The first key portion 431 is configured to be fitted to the first key groove 41. On the other hand, the second key portion 432 is configured to be fitted to the second key groove 42. Because of this, the key body 43 is fitted not only to the first key groove 41 but also to the second key groove 42.

The first key portion 431 is greater in axial length than the second key portion 432. The first key portion 431 extends from one end to the other end of the first key groove 41. On the other hand, the second key portion 432 extends from one end to the other end of the second key groove 42.

The key body 43 includes a stopper portion 433. The stopper portion 433 protrudes from the first key portion 431 in an intersecting direction with the axial direction. In the present preferred embodiment, the stopper portion 433 protrudes radially outward from the first key portion 431. The stopper portion 433 is in axial contact with the rotor 31, whereby the key body 43 is restricted from moving in the axial direction. When described in detail, the key body 43 can be restricted from moving rightward by the stopper portion 433 in FIG. 1. It should be noted that the stopper portion 433 can protrude radially inward, or alternatively, can protrude in the circumferential direction. Yet alternatively, the key body 43 can include a plurality of stopper portions 433 that are different in protruding direction from each other.

The key body 43 includes a distal end 434. As shown in FIG. 1, the distal end 434 axially protrudes from the first key groove 41. In other words, the distal end 434 protrudes rightward from the first key groove 41 in FIG. 1.

Figure 5:
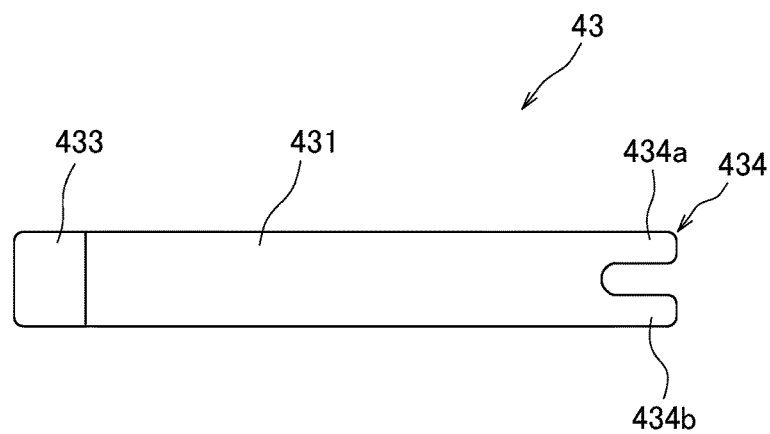
FIG. 5 is a plan view of the key body.

FIG. 5 is a plan view of the key body 43 seen from radially outside. As shown in FIG. 5, the distal end 434 is configured to spread in an intersecting direction with the axial direction. In the present preferred embodiment, the distal end 434 is configured to spread in the circumferential direction. When described in detail, the distal end of the first key portion 431 is divided into two as the distal end 434 extending in the axial direction. In other words, the distal end 434 is divided into a first distal end 434a and a second distal end 434b. The distal end 434 can be spread in the circumferential direction by bending the first and second distal ends 434a and 434b in directions away from each other. By thus circumferentially spreading the distal end 434, the key body 43 can be restricted from moving in the axial direction. When described in detail, the key body 43 can be restricted from moving leftward by the distal end 434 in FIG. 1. It should be noted that the distal end 434 can be configured to spread in a radial direction. In this case, for instance, the first distal end 434a can be bent radially outward, while the second distal end 434b can be bent radially inward.

[Modifications]

One preferred embodiment of the present invention has been explained above. However, the present invention is not limited to the above, and a variety of changes can be made without departing from the gist of the present invention. It should be noted that various modifications to be described are simultaneously applicable.

Figure 6:
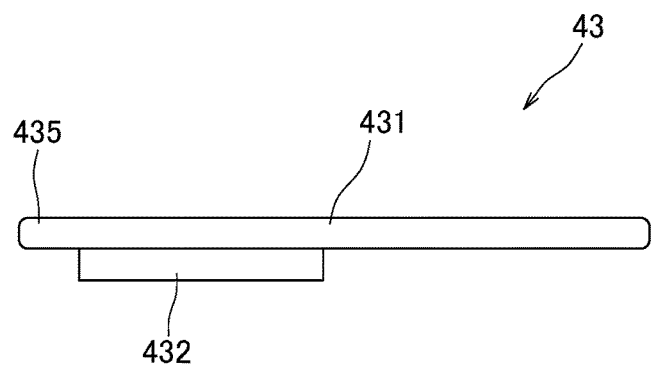
FIG. 6 is a side view of a key body according to a modification.
Figure 7:
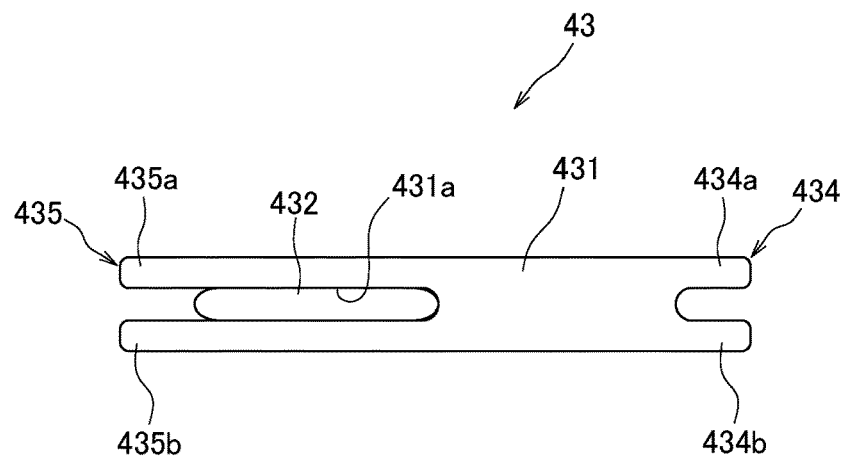
FIG. 7 is a plan view of the key body according to the modification.

(a) In the preferred embodiment described above, the first and second key portions 431 and 432 are provided as a single member integrated with each other. However, the configuration of the key body 43 is not limited to this. For example, as shown in FIGS. 6 and 7, the first and second key portions 431 and 432 can be provided as different members separated from each other.

The first key portion 431 has a flat plate shape. The first key portion 431 includes a slit 431a axially extending from the base end of the key body 43 toward the distal end of the key body 43. The slit 431a extends in the axial direction. The slit 431a is opened to the base end side.

The second key portion 432 is fitted to the slit 431a. Because of this, the first and second key portions 431 and 432 are rotated unitarily with each other without being rotated relative to each other.

The second key portion 432 is lesser in axial length than the slit 431a. The second key portion 432 is greater in thickness than the first key portion 431. Besides, the second key portion 432 protrudes radially inward from the slit 431a. The second key portion 432 is fitted to the second key groove 42 at the part protruding from the slit 431a.

Figure 8:
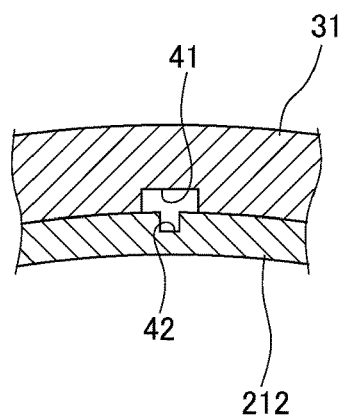
FIG. 8 is a view of a key groove according to the modification and corresponds to FIG. 3.

As shown in FIG. 8, the first key groove 41 is greater in width than the second key groove 42. Besides, as shown in FIG. 7, the first key portion 431 is greater in width than the second key portion 432.

Moreover, the key body 43 does not include the stopper portion. Instead, the key body 43 includes a base end 435. The base end 435 protrudes from the first key groove 41 in the axial direction. When described in detail, the base end 435 protrudes to the opposite side of the distal end 434 in the axial direction.

The base end 435 is configured to spread in an intersecting direction to the axial direction. For example, the base end 435 is configured to spread in the circumferential direction. When described in detail, the base end 435 axially extends at the base end of the first key portion 431. The base end 435 includes a first base end 435a and a second base end 435b. The base end 435 can be spread in the circumferential direction by bending the first and second base ends 435a and 435b in directions away from each other. By thus circumferentially spreading the base end 435, the key body 43 can be restricted from moving in the axial direction. It should be noted that the base end 435 can be configured to spread in a radial direction. For example, the first base end 435a can be bent radially outward, while the second base end 435b can be bent radially inward.

(b) In the preferred embodiment described above, the second key groove 42 is provided only on the cover 21, specifically, on the first cylindrical portion 212. However, the configuration of the restriction mechanism 4 is not limited to this. For example, the second key groove 42 can be provided only on the impeller 22, specifically, on the second cylindrical portion 225. In this case, the second cylindrical portion 225 is greater in outer diameter than or equal in outer diameter to the first cylindrical portion 212.

REFERENCE SIGNS LIST

1: Starting device
2: Torque converter
21: Cover
22: Impeller
3: Electric motor
31: Rotor
32: Stator
4: Restriction mechanism
41: First key groove
42: Second key groove
43: Key body
431: First key portion 431a: Slit
432: Second key portion
434: Distal end

What is claimed is:

1. A starting device, comprising:
a fluid coupling;
an electric motor including a rotor and a stator, the rotor disposed radially outside the fluid coupling, the stator disposed radially outside the rotor; and
a restriction mechanism configured to restrict relative rotation between the fluid coupling and the rotor,
wherein the restriction mechanism includes a first key groove provided on an inner peripheral surface of the rotor so as to extend in an axial direction; a second key groove provided on an outer peripheral surface of the fluid coupling so as to extend in the axial direction, the second key groove being lesser in length than the first key groove; and a key body including a first key portion and a second key portion, the first key portion being fitted to the first key groove and the second key portion being fitted to the second key groove,
wherein the rotor and the fluid coupling are rotationally positioned relative to each other such that the first key groove and the second key groove are circumferentially aligned with each other, and
the key body fits within both circumferentially aligned grooves so as to prevent relative rotation between the rotor and the fluid coupling.

2. The starting device according to claim 1, wherein
the fluid coupling includes a cover and an impeller,
the cover and the impeller form the outer peripheral surface of the fluid coupling, and
the second key groove is provided only on one of the cover and the impeller.

3. The starting device according to claim 2, wherein the one of the cover and the impeller, on which the second key groove is provided, is greater in outer diameter than another thereof.

4. The starting device according to claim 2, wherein
the cover includes a first cylindrical portion extending in the axial direction,
the impeller includes a second cylindrical portion extending in the axial direction, the second cylindrical portion fixed to the first cylindrical portion,
the first and second cylindrical portions form the outer peripheral surface of the fluid coupling, and
the second key groove is provided on one of the first and second cylindrical portions greater in plate thickness than another thereof.

5. The starting device according to claim 1, wherein the first key groove extends from one end to another end of the rotor in the axial direction.

6. The starting device according to claim 1, wherein the first and second key portions are provided as different members separated from each other, the first and second key portions engaged to be non-rotatable relative to each other.

7. The starting device according to claim 6, wherein
the first key groove is greater in width than the second key groove,
the first key portion includes a slit extending from a base end thereof in the axial direction, and
the second key portion is fitted to the slit.

8. The starting device according to claim 1, wherein
the key body includes a distal end protruding from the first key groove in the axial direction, and
the distal end spreads in a direction orthogonal to the axial direction.

* * * * *